United States Patent Office.

AUGUST KNOP, OF RHEINAU, GERMANY.

PROCESS OF MAKING NITRITES.

SPECIFICATION forming part of Letters Patent No. 595,178, dated December 7, 1897.

Application filed March 18, 1897. Serial No. 628,212. (No specimens.)

*To all whom it may concern:*

Be it known that I, AUGUST KNOP, doctor of philosophy, a subject of the Grand Duke of Hessen, residing at Rheinau, Baden, Germany, have invented new and useful Improvements in the Manufacture of Nitrites, of which the following is a specification.

All previous attempts to prepare nitrites from nitrates by a method other than that depending on reduction with lead have yielded no practical result. There are diverse processes known which employ sulfur or sulfur compounds or carbon compounds. Methods which make use of sulfur cannot well be carried out in practice, because the reaction is unusually violent, being attended by deflagration, and the yield of nitrite is very small. For the same reason reduction with carbon in the form of wood-charcoal, coal, &c., cannot be effected in practice. If carbon in the form of graphite or coke is allowed to attack fused saltpeter, the carbon enters into the reaction at a high temperature without deflagration. The quantity of nitrite formed, however, is so small that a profitable preparation is not to be thought of.

The process which forms the subject of my invention, however, renders possible the use of carbon in its cheapest form by adding a certain quantity of caustic alkali to the molten nitrate. The carbon is employed in the form of fine powder, which has also been mixed with melted caustic alkali. The addition of caustic alkali acts, broadly, in this way—viz., that the melted mass is mobile throughout the whole operation and that the oxidation of the carbon proceeds quickly at a comparatively low temperature, the resulting carbon dioxid being fixed by the caustic alkali. By mixing the carbon with fused caustic alkali the ready intermixture of the former with the molten mass of nitrate is insured. By this method the reaction occurs in a short time with nearly theoretical yield and with such smoothness as cannot be realized by the use of nitrate and carbon without the addition of caustic alkali.

Of the raw materials in question—viz., coal, graphite, coke, &c.—coke has proved the best.

The following quantities are used for preparing sodium nitrite: Thirty-one kilos of coke are stirred into one hundred and twenty kilos of fused caustic soda and the molten mass poured out and allowed to cool. Three hundred kilos of saltpeter are then melted with one hundred and twenty kilos of ninety-per cent. caustic soda in a pot provided with a stirrer, and the caustic soda containing the coke is introduced in pieces, a little at a time and with stirring. The reaction proceeds with moderate frothing and is finished in some three to four hours. The quantity of nitrite formed corresponds nearly with the theoretical yield. The reaction may be expressed by the following equation:

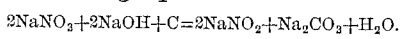
$$2NaNO_3 + 2NaOH + C = 2NaNO_2 + Na_2CO_3 + H_2O.$$

The carbon is oxidized to carbon dioxid, which combines with the caustic soda. The finished melt consists of sodium carbonate, caustic soda, and nitrite, and the last-named can easily be obtained pure.

This process has great economical advantages over others. In the same time nearly twice as much nitrite as is possible by the lead process in a melting-pot can be produced with a corresponding economy of fuel and wages. The amount of coke consumed is insignificant. The caustic soda is recovered in a simple way by causticising the sodium carbonate and is used again in the process.

I claim—

1. The herein-described process of manufacturing alkali nitrites, which consists in subjecting to the action of heat, a mixture of a nitrate of the same alkali, the caustic alkali of the same element, and carbon, substantially as set forth.

2. The herein-described process of manufacturing alkali nitrites, which consists in subjecting to the action of heat, a mixture of a nitrate of the same alkali, the caustic alkali of the same element, and coke, substantially as set forth.

3. The herein-described process of manufacturing nitrites, which consists in subjecting to the action of heat, a mixture of a nitrate, a caustic alkali, and carbon, substantially as described.

In testimony whereof I have signed my name to this specification in the presence of two subscribing witnesses.

AUGUST KNOP.

Witnesses:
D. ERLENBACH,
F. WACKER.